(12) United States Patent  
Darst

(10) Patent No.: US 7,461,902 B1
(45) Date of Patent: Dec. 9, 2008

(54) AUGER CAR BEARING SUPPORT

(76) Inventor: Robert Darst, 1233 Wolfe Ave., Louisville, KY (US) 40213

( * ) Notice: Subject to any disclaimer, the term of this patent is extended or adjusted under 35 U.S.C. 154(b) by 455 days.

(21) Appl. No.: 11/259,465

(22) Filed: Oct. 26, 2005

(51) Int. Cl.
*E21C 25/00* (2006.01)
*F16C 25/04* (2006.01)

(52) U.S. Cl. .......................................... 299/67; 384/213
(58) Field of Classification Search ................ 299/67; 384/206, 208, 209, 211, 212, 213
See application file for complete search history.

(56) References Cited

U.S. PATENT DOCUMENTS

| | | | |
|---|---|---|---|
| 1,183,200 A | * | 5/1916 | Holy ........................... 384/434 |
| 3,762,786 A | * | 10/1973 | Bailey et al. ................. 384/286 |
| 3,794,392 A | | 2/1974 | Scott |
| 3,812,607 A | | 5/1974 | Fenske |
| 4,253,711 A | | 3/1981 | Lynn et al. |
| 4,384,643 A | | 5/1983 | Cone |
| 4,763,904 A | | 8/1988 | Martinie |
| 4,765,757 A | * | 8/1988 | Hartl ........................... 384/213 |
| 5,085,520 A | | 2/1992 | Fujan |
| 5,147,133 A | | 9/1992 | White |
| 5,669,717 A | | 9/1997 | Kostrzewsky |
| 6,004,037 A | | 12/1999 | Harris et al. |

OTHER PUBLICATIONS

Split spherical bearings solve the downtime dilemma, Rock Products, Aug. 2000.*
Oberg, Erik, Machinery's Handbook, 2000. pp. 2197-2203.*

* cited by examiner

*Primary Examiner*—John Kreck
(74) *Attorney, Agent, or Firm*—Camoriano and Associates; Theresa Fritz Camoriano

(57) ABSTRACT

An auger shaft bearing support includes a multi-part inner bearing, a multi-part outer bearing, and a multi-part housing. The inner bearing is secured to the auger shaft and rotates with the auger shaft. The inner bearing has a partial spherical outer surface that is received in the outer bearing.

11 Claims, 8 Drawing Sheets

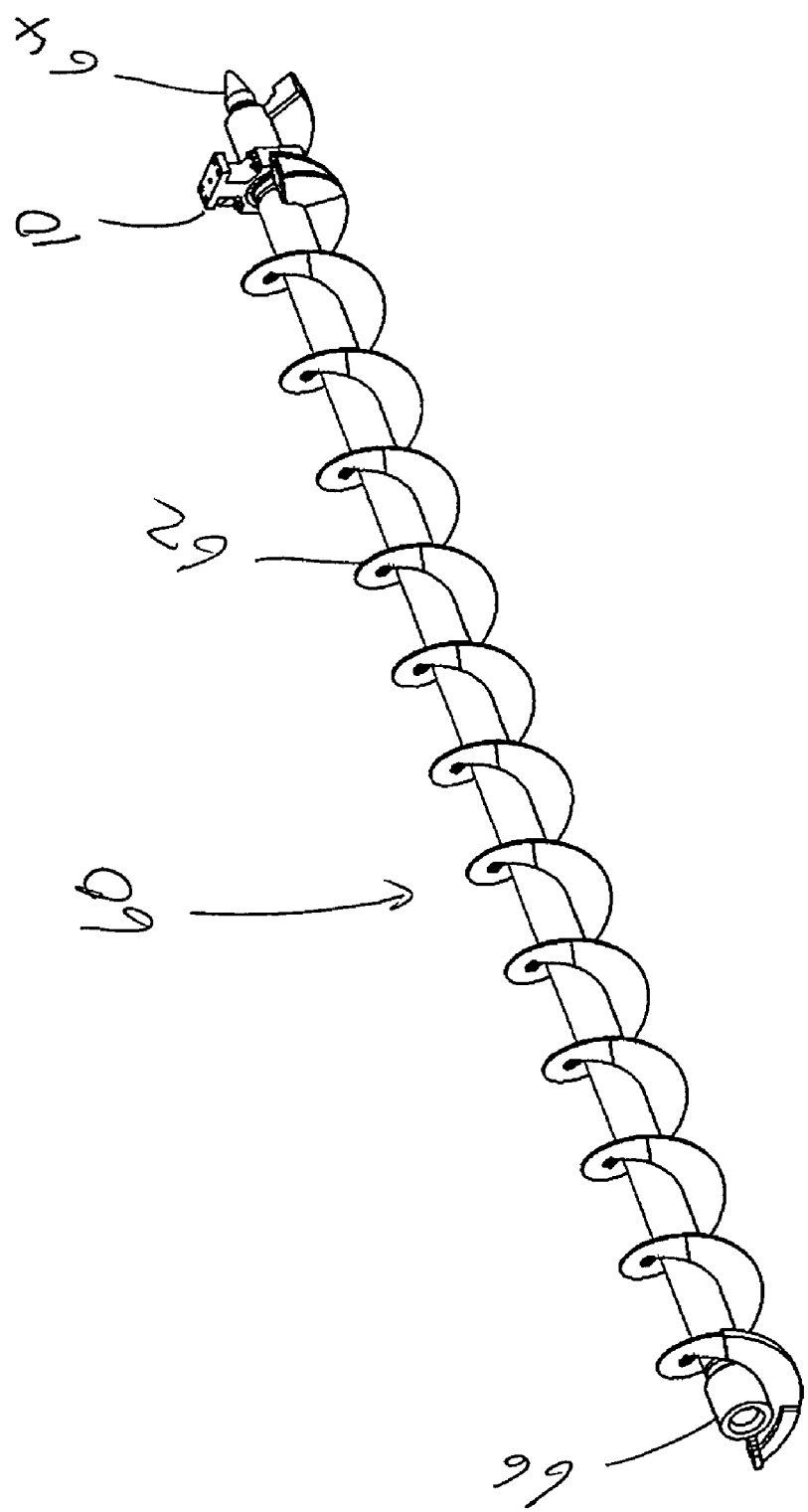

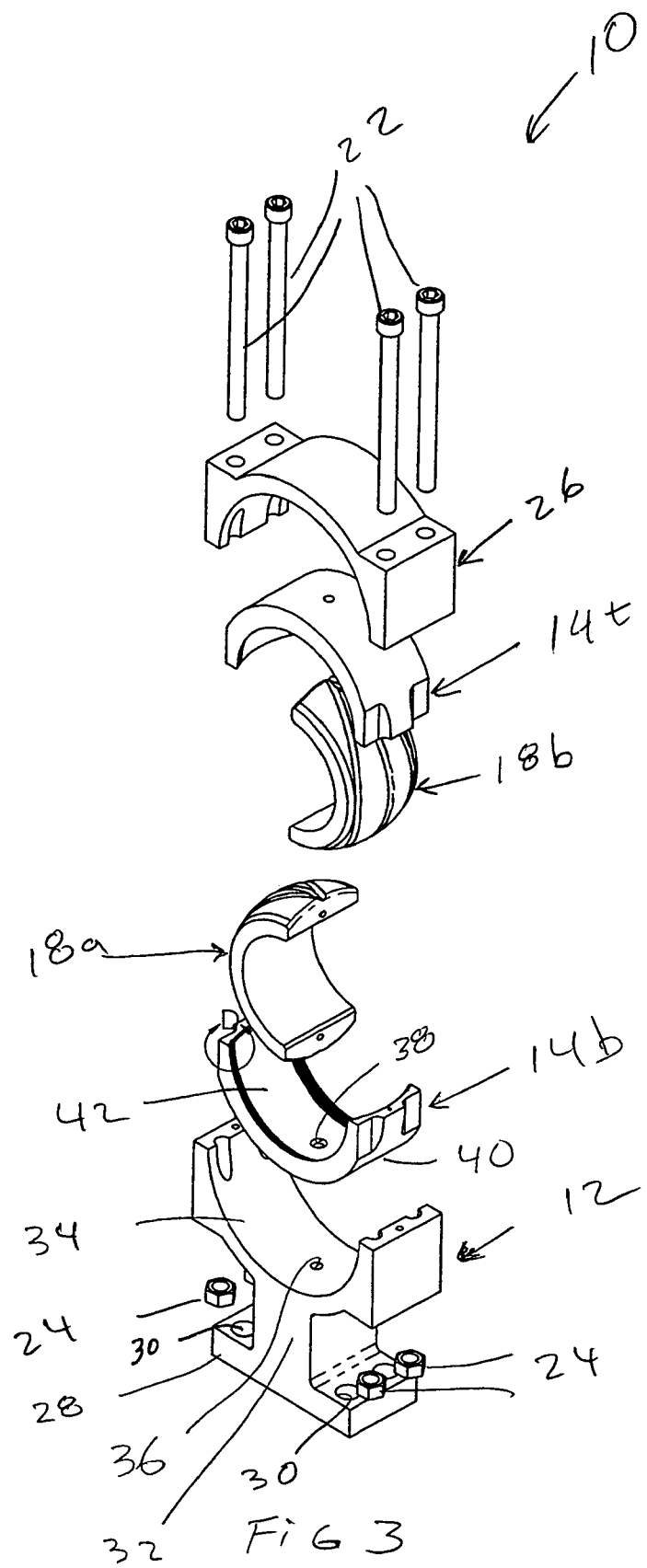

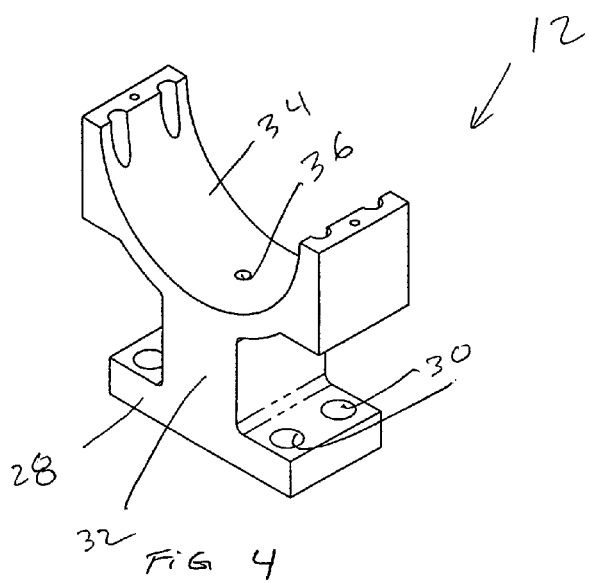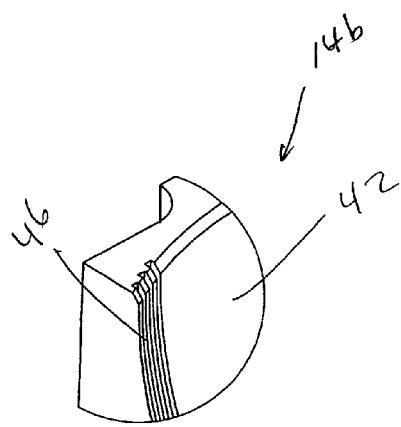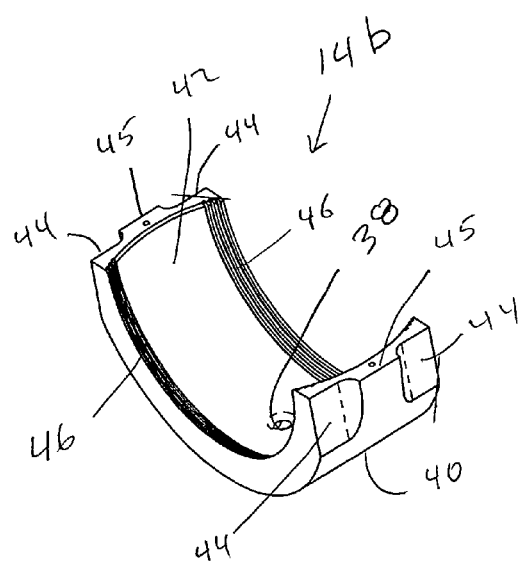

AUGER CAR BEARING SUPPORT

BACKGROUND

The present invention relates to an auger car bearing support. In high wall mining, a mining car is fed into the wall of the mine to remove the coal. The front mining car has a pair of bits and is driven by a separate drive module, which mounts to the rear of the bits to drive them. The front car (or lead car) chews up the coal, and then, as it travels into the wall, the drive module is removed, auger cars are attached to the back of the lead car, and the drive module is attached to the back of the rear auger car, driving the rear augers, which, in turn, drive the other augers and the bits. As the bits chew up the coal, they feed the coal onto the augers, which then carry the coal out of the mine. There has been a big problem with the bearing supports for the auger shafts wearing out very quickly, typically in 2 to 4 weeks of operation. This also damages the auger shaft itself, requiring repair and replacement of the auger shaft. The repairs are expensive, and they delay the mining operation, resulting in lost profits. Thus, it would be very helpful to provide a more reliable support for the augers which lasts longer and does not damage the augers.

SUMMARY

One embodiment provides a two-piece, spherical, heat treated, low alloy steel inner bearing welded to the auger shaft. This inner bearing rotates inside a two-piece, reverse spherical, spinodal bronze outer bearing which is kept from rotation within a bearing housing via bearing cap bolts. The bearing housing incorporates a lubrication passage which extends through the outer bearing so as to lubricate the spherical surfaces between the inner and outer bearings. This lubrication passage permits the lubrication of the bearing without disassembly.

The two-piece design of the inner and outer bearings, as well as of the bearing housing, facilitates assembly and repair, as well as retrofitting of existing installations. The outer bearing includes a series of labyrinth seal grooves which retain the lubricant and help keep contaminants out of the bearing.

In one embodiment, the inner bearing is flash chrome plated to increase its hardness to approximately 60C in the Rockwell hardness scale. Additionally, the surface of the inner bearing surface may be polymer-coated to seal any pores or micro-cavities. The outer, spinodal bronze bearing has a hardness of approximately 30C Rockwell, such that, in case of any wear between the two bearings, the outer bearing will wear first, before the inner bearing wears. Replacing the outer bearing is much easier than replacing the inner bearing, since the inner bearing is welded to the auger shaft. By the same token, the lubrication grooves are located on the inner bearing such that the grooves (and therefore lubrication) will not be adversely affected even if the outer bearing wears.

BRIEF DESCRIPTION OF THE DRAWINGS

FIG. 1A is a perspective view of an auger shaft including an auger shaft bearing support made in accordance with the present invention;

FIG. 3 is an exploded, perspective view of the auger shaft bearing support of FIG. 2A;

FIG. 4 is a perspective view of the pedestal bearing support of FIG. 3;

FIG. 5 is a perspective view of one half of the outer bearing of FIG. 3;

FIG. 6 is an enlarged, detailed view of the labyrinth seal grooves of the outer bearing of FIG. 5 (See detail "D" in FIG. 3);

DESCRIPTION

Figure 1B:
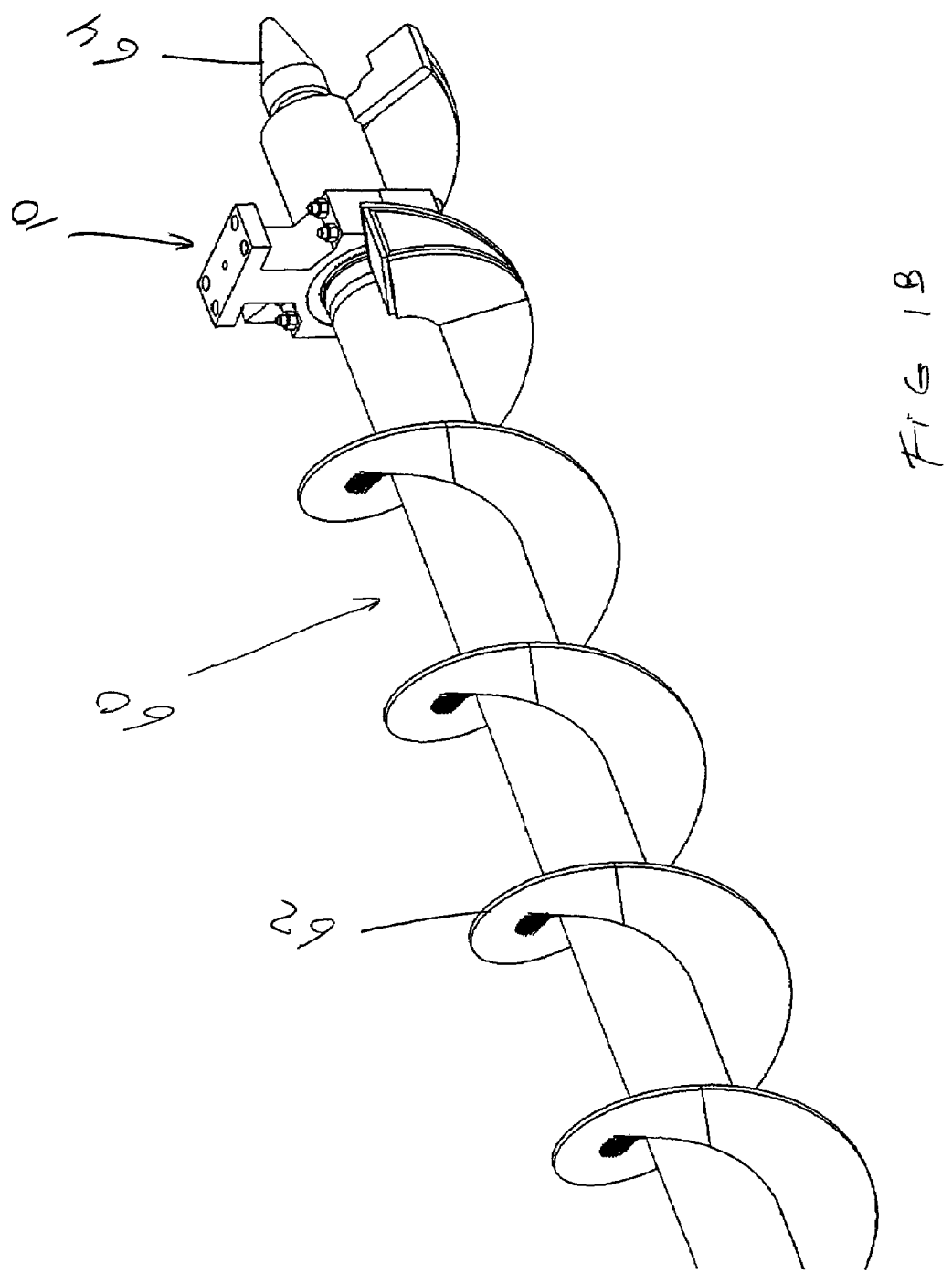
FIG. 1B is a broken-away, enlarged view of one end of the auger shaft of FIG. 1A.
Figure 1C:
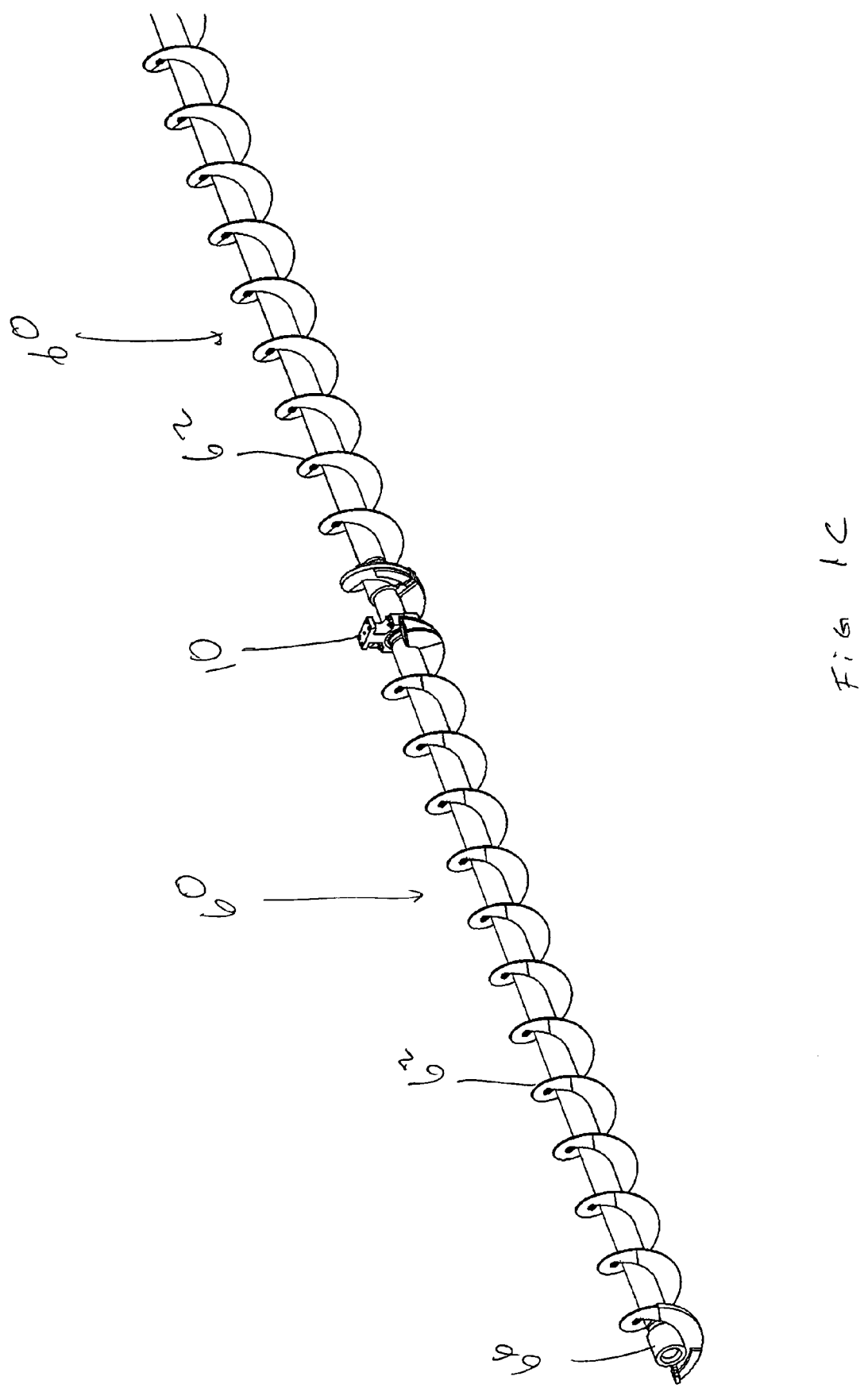
FIG. 1C is a perspective view of two auger shafts of FIG. 1A connected together.

FIGS. 1A-1D show an auger shaft 60, including an auger shaft bearing support 10 made in accordance with the present invention. The auger shaft 60 is an elongated tubular element defining a screw 62 along its outer surface, a male connector 64 at its first end, and a female connector 66 at its second end. The male connector 64 of one auger shaft 60 engages the female connector 66 of an adjacent, identical auger shaft 60 (as seen in FIG. 1C) in order to form a continuous, multi-part auger shaft which may be made up of several individual auger shafts 60.

In a typical auger car 68 (See FIG. 1D) two auger shafts 60 are placed in a substantially parallel arrangement extending horizontally from the front of the auger car 68 to the rear of the auger car 68, with an auger shaft bearing support 10 mounted to the inside of the structure of the auger car 68 to secure and rotationally support each auger shaft 10 on the auger car 68. An enlarged detail of an auger shaft bearing support 10 mounted onto the auger shaft 60 is shown in FIG. 1B.

The auger shaft bearing support 10 includes a bearing pedestal 12, which defines a plurality of through holes 30 through which bolts (not shown) pass in order to secure the bearing support 10 to the structure of the auger car 68. It also includes a radially split outer bearing including a lower-half outer bearing 14b and an upper-half outer bearing 14t, and a radially split inner bearing including a left-half inner bearing 18a, and a right-half inner bearing 18b. It also includes cap bolts 22, cap bolt nuts 24, and a pedestal cover 26. As discussed in more detail below, the lower and upper outer bearing halves 14b, 14t are identical, and together they complete the outer bearing assembly 14. Similarly, the left and right inner bearing halves 18a, 18b are also identical, and together they complete the inner bearing assembly 18. The inner and outer bearings 18, 14 are thus each radially split into two identical halves 18a, 18b and 14b, 14t respectively. Note that the designations of upper, lower, left and right are for reference only and do not necessarily reflect the positions of the items in actual operation.

Figure 1D:
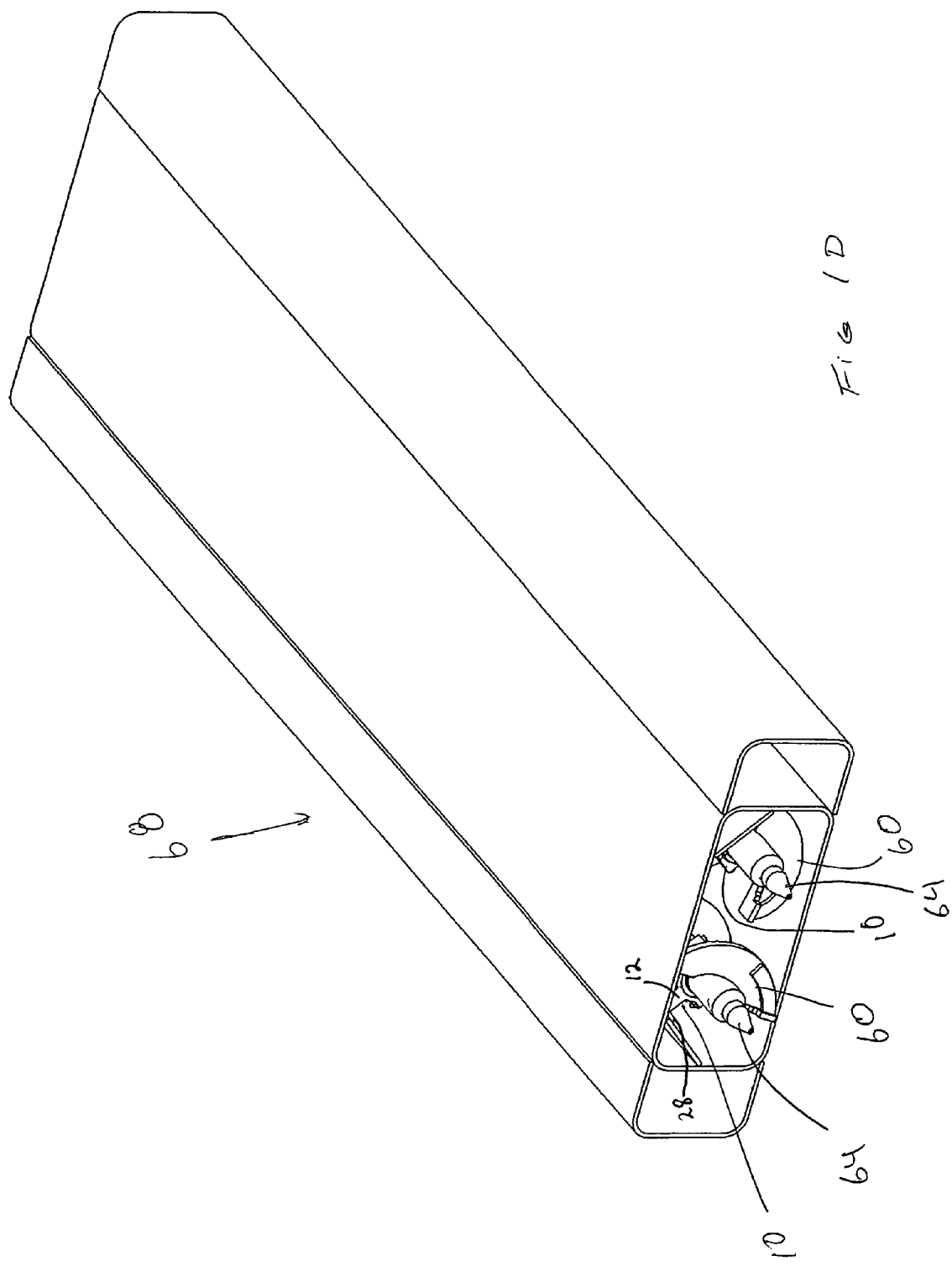
FIG. 1D is a perspective, schematic view of an auger car, including two parallel auger shafts of the type shown in FIG. 1A.
Figure 2A:
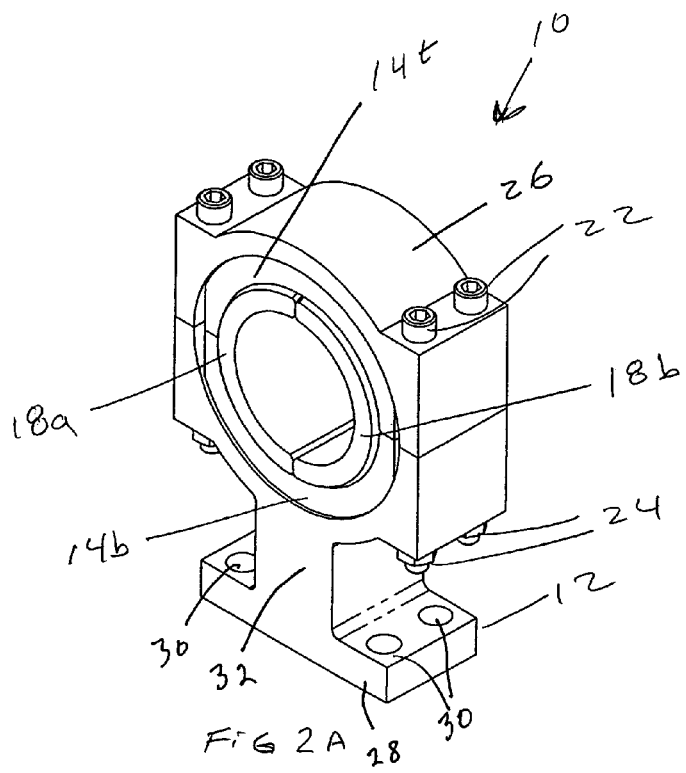
FIG. 2A is a perspective view of the auger shaft bearing support of FIG. 1A.
Figure 2B:
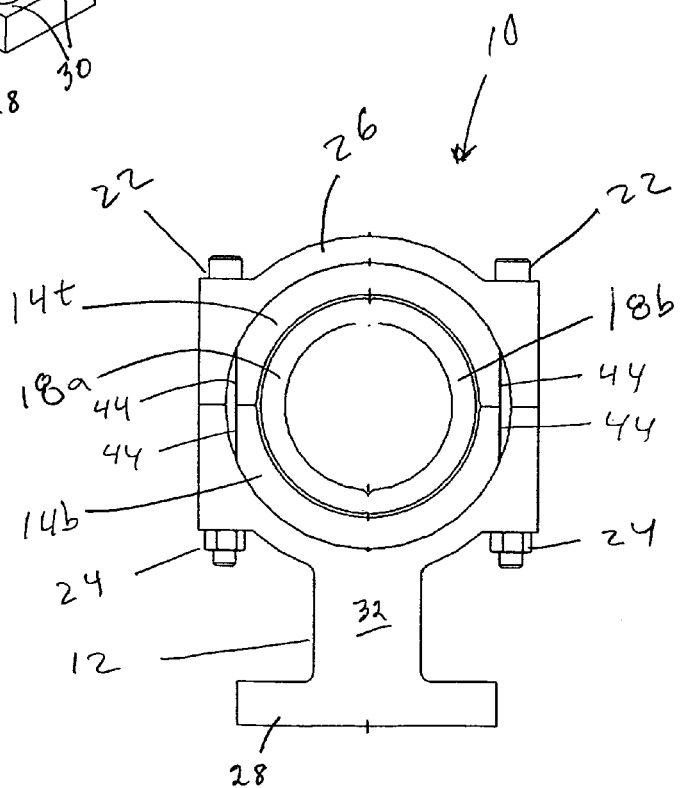
FIG. 2B is an end view of the auger shaft bearing support of FIG. 2A.

Referring to FIG. 4, the bearing pedestal 12 includes a flat base 28 defining the through holes 30 for securing the base 28 to the auger car 68 (See FIG. 1D). Each auger car 68 contains two parallel auger shafts 60, and each auger shaft 60 has one bearing support 10 mounted near one end of the auger car 68. A vertically-extending web 32 projects from the flat base 28, and this web 32 supports a semi-cylindrical saddle 34 which, in turn, supports the inner and outer bearings 18, 14 respectively, as well as the pedestal cover 26 when the auger shaft bearing support 10 is assembled.

A long, through opening 36 extends from the saddle 34 through the web 32 and out through the base 28. As will be described in more detail later, this through opening 36 (also referred to as a lubrication passage 36) may be used to inject lubricant from outside of the auger shaft bearing support 10 to the interface between the inner and outer bearing assemblies 18, 14. It should be noted that one end of the lubrication passage 36 emerges at the axis of symmetry of the saddle 34 for ease in matching up and aligning with a corresponding through opening 38 (See FIG. 5) in the lower-half outer bearing 14b (Even though this is a convenient location for the lubrication passage 36, it could be located elsewhere as long as the corresponding through opening 38 in the outer bearing 14 lines up with it). The other end of the lubrication passage 36 may emerge at any point on the external surface of the bearing pedestal 12 where it is convenient to reach for injecting the lubricant into the auger shaft bearing support 10. Though not illustrated, it is possible for the pedestal cover 26 also to have a similar through opening to be able to inject lubricant through the cover 26, if this is a more accessible location.

Referring to FIG. 5, the lower-half outer bearing 14b defines a semi-cylindrical outer surface 40 (which rests on the semi-cylindrical saddle 34 of the bearing pedestal 12), and a partial reverse-spherical inner surface 42 upon which the partial spherical inner bearing 18 rotates, as discussed in more detail below. The lower-half outer bearing 14b defines a through opening 38, located so as to align with the lubrication passage 36 in the bearing pedestal 12 such that lubricant may be injected from outside of the auger shaft bearing support 10 and reach through the lubrication passage 36 in the bearing pedestal 12 and through the through opening 38 in the lower-half outer bearing 14b.

The lower-half outer bearing 14b also defines flats 44 to prevent rotation of the outer bearing 14. The cap bolts 22 press against these flats 44 to lock the outer bearing 14 between the bearing pedestal 12 and its cover 26, and to prevent rotation of the outer bearing 14. Of course, other mechanisms could be used to prevent rotation of the outer bearing 14 relative to the housing, including pinning or bolting the outer bearing to the housing. It should be noted that, between the flats 44, there is a projection 45 such that, when assembled, the cap bolts 22 straddle the projection 45. However, there is a clearance between the cap bolts 22 and the projection 45 which allows some axial movement of the entire outer bearing 14, inner bearing 18, and auger shaft 60 assembly relative to the pedestal 12. In this preferred embodiment, this axial movement is on the order of ⅛" in each direction (fore and aft) for a total allowable axial movement of approximately ¼". This feature allows for the slight length variations of the augers and the auger housings.

Finally, the edges of the interior surface of the lower-half outer bearing 14b define a plurality of parallel labyrinth seal grooves 46 (See FIG. 6) which retain the lubricant and help keep contaminants out of the bearing surfaces. A labyrinth seal is a non-contacting circumferential seal utilizing a tortuous path for flow of lubricant between the stationary and rotating parts. The design utilizes a series of pressure drops to reduce the leakage. In this instance, the stationary part is the outer bearing 14 and the rotating part is the inner bearing 18, and the series of grooves 46 form the tortuous path for flow, which tends to keep the lubricant inside the auger shaft bearing support 10, and the contaminants outside.

The lower-half outer bearing 14b and the upper-half outer bearing 14t are identical, each terminating along a horizontal planar surface. When those horizontal planar surfaces are joined together, they from the outer bearing 14 which, in a preferred embodiment, is made from spinodal bronze with a Rockwell hardness of between 28C and 32C. Spinodal bronze is a high strength copper alloy. The strength comes from the spinodal structure, which is an ordered arrangement of the nickel and tin atoms in waves only millionths of an inch in length.

Figure 7:
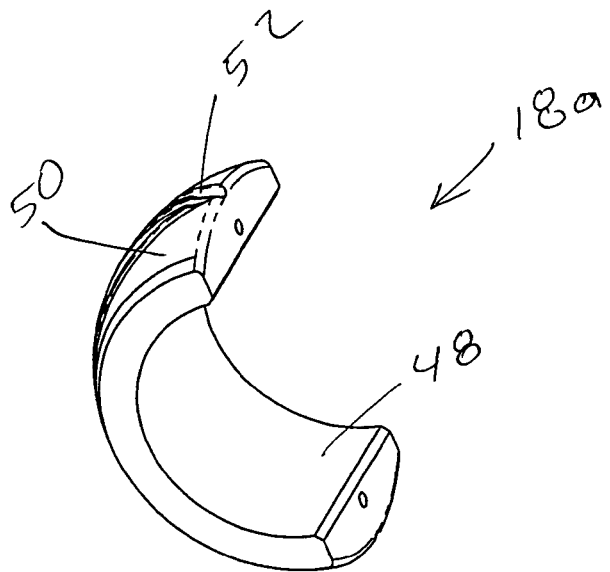
FIG. 7 is a perspective view of one half of the inner bearing of FIG. 3.
Figure 8:
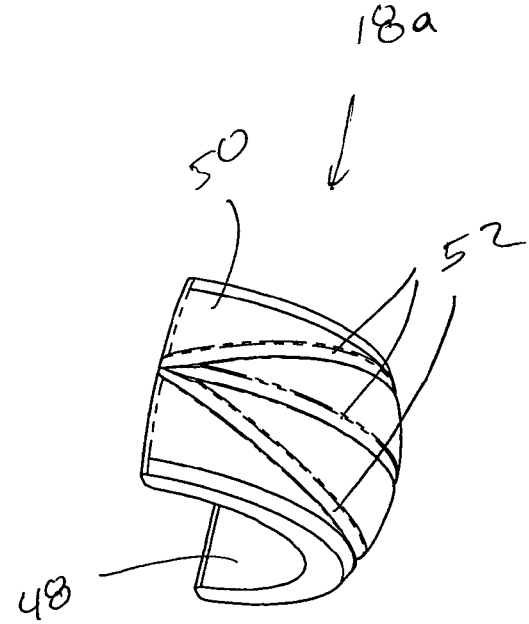
FIG. 8 is an opposite-end perspective view of the inner bearing of FIG. 7, highlighting the lubrication grooves.

Referring now to FIGS. 7 and 8, the left-half inner bearing 18a defines a semi-cylindrical inner surface 48 (which wraps around and is welded to the rotating shaft 60), and a partial spherical outer surface 50 which rotates against the similarly shaped reverse-spherical inner surface 42 of the outer bearing 14.

The partial spherical outer surface 50 defines a plurality of lubrication grooves 52 which are aligned with, and/or are in fluid communication with, the through opening 38 in the outer bearing 14. The lubricant which is injected through the lubrication passage 36 passes through the through opening 38 in the outer bearing 14 and onto the central lubrication groove 52. The lubricant travels via the lubrication grooves 52 to effectively lubricate the interface between the reverse-spherical inner surface 42 of the outer bearing 14 and the partial spherical outer surface 50 of the inner bearing 18.

The left-half inner bearing 18a and the right-half inner bearing 18b are identical, each terminating in a planar surface. When the planar surfaces are joined together, they form the inner bearing 18 which, in one preferred embodiment, is made from a heat treated, low alloy steel. The inner bearing 18 may be flash chrome plated to increase its hardness to approximately 60C in the Rockwell hardness scale. Additionally, the outer surface 50 of the inner bearing 18 may be polymer-coated to seal any pores or micro-cavities.

Since the inner bearing 18 is made from a harder material than the outer bearing 14 (generally 50C Rockwell hardness or greater compared with approximately 30C for the outer bearing 14), if there is any wear between the inner and outer bearings 18, 14, the outer bearing 14 will wear first, before any significant wear occurs on the inner bearing 18. The lubrication grooves 52 are on the outer surface 50 of the inner bearing 18 such that the grooves 52 will not be affected even if the outer bearing 14 wears.

The auger shaft bearing support 10 may be assembled to the auger shaft 60 in the following manner: The left-half and right-half inner bearings 18a, 18b are welded or otherwise secured to the shaft 60, such that, as the shaft 60 rotates, the inner bearing 18 rotates with it. The two-piece design of the inner bearing 18 facilitates the mounting of the inner bearing 18 to the shaft 60 without having to disassemble or remove any items mounted to the ends 64, 66 of the shaft 60 (such as additional shafts 60). The flat, planar ends of the inner bearing halves 18a, 18b are aligned along a diameter of the cylindrical auger shaft 60.

The lower-half outer bearing 14b is placed on the bearing pedestal 12, and these two items 12, 14b are placed under the shaft-mounted inner bearing 18. The pedestal 12 may then be bolted to the frame of the auger car 68 using bolts (not shown) which go through the holes 30 in the pedestal 12. The upper-half outer bearing 14t is then placed over the inner bearing 18 and abutting the lower-half outer bearing 14b. The pedestal cover 26 is then placed over the upper half outer bearing 14t, and the entire assembly is secured with the cap bolts 22 and the corresponding nuts 24. The cap bolts 22 press against the flats 44 of the outer bearing 14 to keep this outer bearing 14 within the auger shaft bearing support 10 and to prevent the rotation of the outer bearing 14.

The partial reverse-spherical inner surface 42 of the outer bearing 14 secures the similarly shaped partial spherical outer surface 50 of the inner bearing 18. These partial spherical surfaces also allow for some misalignment of the auger shaft 60 relative to its bearing support 10, and it provides support for thrust forces acting axially along the shaft 60.

As in the case of the inner bearing 18, the two-piece design of the outer bearing 14 also allows the quick and easy removal and installation of the outer bearing 14 without having to disassemble or remove any items mounted to the ends of the shaft 60. Since the outer bearing 14 is made from a softer material than the inner bearing 18, this outer bearing 18 is more likely to wear before the inner bearing 18 exhibits any wear. In this event, it is a very simple and inexpensive matter to remove the cap bolts 22, remove the pedestal cover 26, and remove the upper-half outer bearing 14*t*. The lower-half outer bearing 14*b* may now also be removed by rotating it around the inner bearing 18 until the lower-half outer bearing 14*b* pops out. After a quick inspection and cleaning of the parts, new upper-half and lower-half outer bearings 14*t*, 14*b* may be installed following the opposite sequence described above for the disassembly of the auger shaft bearing support 10.

Lubricant is added via the lubrication passage 36, and the unit may be placed back in service. The grooves 46 act as a labyrinth seal to help keep the lubricant inside the auger shaft bearing support 10 and to keep contaminants out.

While the embodiment described above shows a preferred embodiment of an auger shaft bearing support, it will be obvious to those skilled in the art that modifications may be made to the embodiment without departing from the scope of the present invention as claimed.

What is claimed is:

1. An auger shaft bearing support for use in auger cars used in high wall mining, comprising:
    a radially split inner bearing including at least first and second inner bearing portions each having a partial cylindrical inner surface defining an axial direction for mounting to the auger shaft and a partial spherical outer surface;
    a radially split outer bearing including at least first and second outer bearing portions, each having a partial reverse-spherical inner surface which closely matches and provides rotational support for the outer surface of said inner bearing; and
    a bearing housing including at least first and second housing portions defining a saddle which supports said outer bearing, wherein said inner bearing is harder than said outer bearing.

2. An auger shaft bearing support for use in auger cars used in high wall mining, as recited in claim 1, wherein said inner bearing has a Rockwell hardness of at least 50C, and said outer bearing is made from spinodal bronze with a Rockwell hardness of approximately 30C.

3. An auger shaft bearing support for use in auger cars used in high wall mining, as recited in claim 2, wherein said inner bearing is a heat treated low alloy steel.

4. An auger shaft bearing support for use in auger cars used in high wall mining, as recited in claim 3, wherein said inner bearing is polymer-coated.

5. An auger car used in high wall mining, comprising:
    an auger car structure having a front and back and defining an elongated passage extending from the front to the back;
    an auger shaft extending along said passage and having a projection at said front end and a receptacle at said rear end;
    a radially split inner bearing including at least first and second inner bearing portions secured to said auger shaft for rotation with said auger shaft, said inner bearing defining a partial spherical outer surface;
    a radially split outer bearing including at least first and second outer bearing portions, said outer bearing defining a partial reverse-spherical inner surface which closely matches and rotationally supports said partial spherical outer surface of said inner bearing; and
    a bearing housing including at least first and second bearing housing portions, said housing defining a saddle which supports said outer bearing, and said bearing housing being mounted on said auger car structure, wherein said inner bearing is harder than said outer bearing.

6. An auger car as recited in claim 5, wherein said outer bearing is made of spinodal bronze.

7. An auger car as recited in claim 6, wherein said inner bearing is polymer-coated.

8. An auger car as recited in claim 7, wherein said outer bearing consists of two identical outer bearing halves and said inner bearing consists of two identical inner bearing halves.

9. An auger car as recited in claim 8, and further comprising a second auger shaft and a second inner bearing; second outer bearing; and second bearing housing supporting said second auger shaft on said auger car.

10. An auger car as recited in claim 8, and further comprising lubrication grooves on said outer surface of said inner bearing; and a lubrication passage defined through said bearing housing and through said outer bearing, wherein said grooves are in fluid communication with said lubrication passages.

11. An auger shaft bearing support for use in auger cars used in high wall mining, comprising:
    a radially split inner bearing including at least first and second inner bearing portions each having a partial cylindrical inner surface defining an axial direction for mounting to the auger shaft and a partial spherical outer surface;
    a radially split outer bearing including at least first and second outer bearing portions, each having a partial reverse-spherical inner surface which closely matches and provides rotational support for the outer surface of said inner bearing;
    a bearing housing including at least first and second housing portions defining a saddle which supports said outer bearing;
    means for preventing rotation of said outer bearing relative to said housing, including flats on said outer bearing and cap bolts which secure said first and second housing portions together and abut said flats;
    wherein said outer bearing defines a projection between said flats, said cap bolts straddling said projection with a clearance between said cap bolts and said projection, wherein said clearance between said cap bolts and said projection allows an axial movement of approximately 0.25 inches of said outer bearing relative to said bearing housing.

\* \* \* \* \*